May 8, 1956 N. AYRES 2,744,475
DEVICE FOR ROLLING PASTRY DOUGH
Filed Dec. 11, 1953

INVENTOR.
Nancy Ayres
BY
ATTORNEY

United States Patent Office 2,744,475
Patented May 8, 1956

2,744,475

DEVICE FOR ROLLING PASTRY DOUGH

Nancy Ayres, Denver, Colo.

Application December 11, 1953, Serial No. 397,623

3 Claims. (Cl. 107—46)

This invention relates to the rolling of pastry dough and the like and particularly to a device for rolling dough in flat form to a predetermined size and configuration.

When making pies at home, the average housewife finds it difficult to roll the dough to the desired size and thickness and in any event finds it necessary to trim the dough to the required size. The trimming results in a substantial amount of waste and requires that the wasted portion of the dough be rerolled and sometimes used in the making of miscellaneous small pastry items because there is insufficient dough for other purposes. It is desirable to minimize the guess work involved in the making of pie crusts and to minimize the waste material resulting from the conventional methods of rolling pie crusts. Accordingly, it is an object of this invention to provide an improved device of simple construction for controlling the size and configuration of pastry dough during the rolling thereof.

Further objects and advantages of this invention will become apparent as the following description proceeds and the features of novelty which characterize this invention will be pointed out with particularity in the claims annexed to and forming a part of this specification.

In carrying out the objects of this invention in one embodiment a plurality of layers of flexible material such as waxed paper or cellophane are provided, one layer being arranged at the bottom and two layers in partially overlapping relationship being placed on top of the first layer. The layers are then bonded together along a closed line representing the configuration of the final form of the dough to be rolled. For example, if the dough is to be rolled in circular form as is common for pie crusts, the layers will be secured together about a circular line and the overlapped portions of the top layers will preferably lie substantially along a diameter of the circle. A tear line is formed along the inner margin of the bond or seal so that the top layers may be torn away exposing the dough. The article thus formed is in the nature of an envelope access being had to the interior through the space between the top overlapped layers. In practicing the method of the invention, a piece of dough for pie crusts or the like is inserted between the layers through the opening provided by the overlapped portion and is located about in the center of the circular line. The dough is then rolled out by a rolling pin until it spreads out toward the circular line. When it reaches the circular line its movement is arrested and the rolling is stopped after all of the dough has reached its position at the circular line. After rolling, the dough may be left between the layers of material until it is to be used and may be frozen and stored in a freezer. When it is desired to use the dough it is merely necessary to tear away the two upper layers and then carry the dough on the lower layer to the pie tin or other vessel in which it is to be used whereupon it is turned upside down and the lower layer peeled away from the crust leaving the crust in position for shaping to the pan and baking.

For a better understanding of this invention, reference may be had to the accompanying drawing in which.

Figure 1:
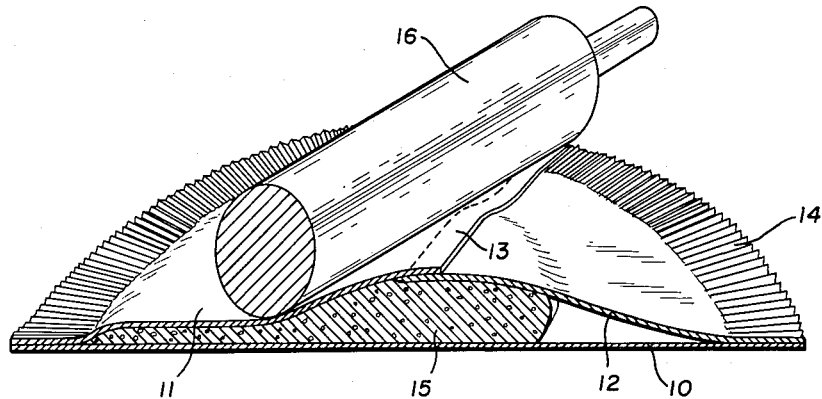
Fig. 1 is an isometric view partly in section showing a device embodying the invention during the process of rolling.

Referring now to Fig. 1, the dough controlling or forming device illustrated comprises a lower sheet or layer of thin flexible material 10 and two upper layers 11 and 12 which are overlapped along their adjacent edges as indicated at 13. The material of which the layers 10, 11 and 12 is made may be waxed or paraffin paper or cellophane or any other material which does not adhere readily to materials such as pie dough. The layers 11 and 12 are heat bonded to the layer 10 along a circular line indicated by the circular portion 14 and the area of the bonded portion may be crimped as illustrated. The crimping of the heat bonded portions increases the effectiveness of the bond and will be recognized as a process employed in the packaging of many articles today.

Figure 2:
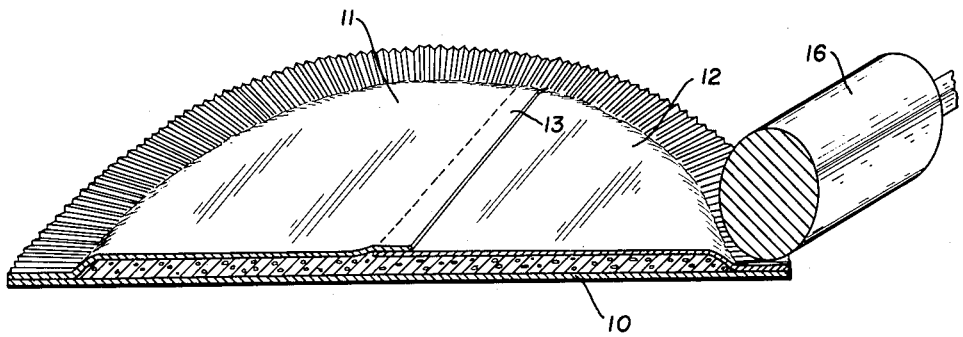
Fig. 2 shows the device of Fig. 1 after completion of the rolling process.

When a piece of pastry dough is to be rolled to the circular configuration of the device of Fig. 1, a lump of the dough is placed between the layer 10 and the layers 11 and 12 near the center of the circle. The dough may readily be inserted through the opening between the overlapped edges of the layers 11 and 12, and when placed on the layer 10, will be of a form and configuration such as that illustrated in the right-hand portion of the mass of dough represented by the numeral 15 in Fig. 1. The dough is then rolled from the center outwardly by operation of a rolling pin as indicated at 16. The pin in the position shown has already been employed to roll the portion of the dough outwardly between the sheets 10 and 11 and is being returned to press more of the central lump 15 outwardly between the sheets 10 and 12. It will readily be understood that by properly positioning a lump of dough of the size necessary to fill the circular area to the desired thickness, it is possible to roll the dough out uniformly in all directions until the circular area between the sheets 10, 11 and 12 has been filled as illustrated in Fig. 2 which shows the completed rolled dough in position between the several sheets of the device. If during the rolling operation, air pockets should form or the dough should happen to stick to some portion of the sheets, the difficulty can readily be removed by raising the sheets 11 and 12 from their overlapped positions at the center. It has been found that pie crust dough of the desired diameter may readily be rolled in the device as illustrated and that the dough will form to the circular shape determined by the line along which the sheets are secured together.

After the dough has been formed to the final shape as shown, for example, in Fig. 2 it may be stored or if it is to be used immediately the upper layers 11 and 12 may be peeled back and torn loose so that the finished rolled dough lies on the lower layer 10. The dough can then be carried on the lower sheet to the pan in which it is to be used and then be turned over so that the layer 10 is on top and can readily be peeled from the dough leaving the dough in position in the pan where it can be shaped as desired to the configuration of the pan or it can be pressed into position against a lower sheet of dough and on top of the pie filling already in position in the pan. If it is not desired to use the dough immediately but it is to be stored for some time, the sheets of the forming device provide a clean and sanitary storing package which may be placed in a freezer so that the dough is kept in frozen condition until it is to be used.

Figure 3:
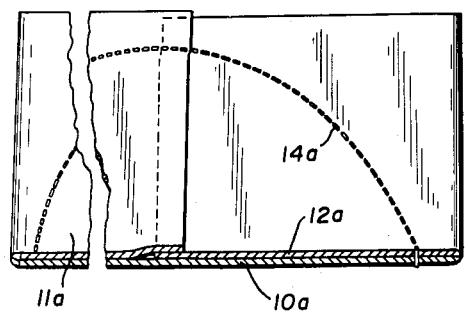
Fig. 3 is a partial view of another embodiment of the invention.

The construction of the forming device shown in Fig. 3 is essentially similar to that shown in Figs. 1 and 2 and corresponding parts have been designated by the same numerals with the suffix letter a. In the arrangement of Fig. 3 the layers 10a, 11a and 12a have been illustrated as formed from a single sheet of waxed paper or other suitable material. When one side of the sheet material has a preferred surface, for example, one having less tendency to stick on contacting the dough, the folding method illustrated is particularly advantageous. Thus the sheet 12a is folded from the right end of the lower sheet 10a and the sheet 11a from the left end, and all sheets lie with facing areas of the same surface in position to contact the dough. In this embodiment the configuration of the final form of the rolled product is determined by a sewed line 14a which may in the case of dough for pie crusts be a circle the same as that illustrated in Figs. 1 and 2. The forming device may be left in the condition it is shown in Fig. 3 without trimming the excess material and this form may be preferred for handling purposes since the material outside the sewed ring 14a may be employed to grip and lift the device together with the rolled dough contained therein. One other advantage of this form is that the sewed line provides air spaces between the sewing so that the material when it is pressed outwardly by rolling will force the air therein through the spaces between the sewing. This provides an escape for air which might otherwise be trapped in bubbles about the periphery of the dough form and create irregularities in the product. It has been found that waxed paper provided with the sewed form has adequate strength for the rolling of pie crust dough to a desired configuration.

Figure 4:
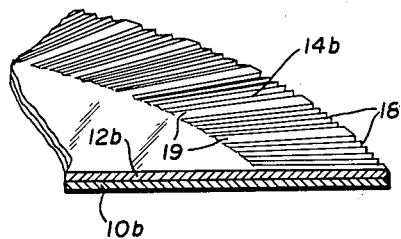
Fig. 4 is an enlarged sectional fragmentary view of a portion of a device similar to that of Fig. 1 showing a still further embodiment of the invention.

The embodiment illustrated in Fig. 4 is similar to that of Fig. 1 and the same numerals have been employed as in Fig. 1 with the suffix b. This figure illustrates a fragmentary view of a device wherein a bonded area 14b defines the closed circular form to which the dough is to be rolled, this bonded area being formed between a lower sheet 10b and an upper sheet 12b in the same manner as the line 14 of Fig. 1. The closed line 14b is formed by the heat bonding process but differs from that of Fig. 1 in that the line 14b is intermittent and comprises bonded sections 18 separated by shorter free or unbonded sections 19. These unbonded sections provide passages through which trapped air will escape when the dough is rolled toward the circular line formed by the bonded area 14b, in the same manner as the escape of air through the sewed line 14a of Fig. 3.

In some cases it may be desirable to employ a double sheet layer for each of the several layers of the device. For example, a layer of wax paper and a layer of cellophane may be combined, the wax paper in contact with the dough and the cellophane as an external sealing layer.

From the foregoing, it is readily apparent that there has been provided by this invention a simple and effective device and method for rolling material such as pie crust dough to a predetermined configuration. Obviously the sealed line between the layers of the device may be of any configuration desired; when it is to be used for pie crust dough, it will, of course, normally be in circular form. The method of rolling dough between the sheets of the controlling device as provided by this invention makes it possible to roll the dough without waste which is ordinarily met because of the requirement for trimming the sides. Furthermore, this method and device make it possible to effectively roll the dough to size without trimming and resultant waste and without the necessity of providing additional apparatus such as rigid rings or shallow pans which might otherwise be required to limit the configuration to which the dough is rolled. The devices of the invention comprising as they do, flat sheets of paper-like material may be packaged in quantity, in sanitary containers, and may readily be maintained in sanitary condition in the home until they are required for use.

While specific forms of the invention have been illustrated and described, various other applications and modifications will occur to those skilled in the art. Therefore, it is not desired that the invention be limited to the specific forms illustrated and described and it is intended by the appended claims to cover all modifications within the spirit and scope of the invention.

I claim:

1. A disposable envelope for use in rolling pastry dough to a predetermined size and shape, comprising a plurality of layers and hand-tearable, smooth, flexible material, one of said layers comprising two sections partially overlapped lying in face engagement with another layer, said layers being peripherally sealed around an unimpeded area of the desired shape of rolled dough forming a tear line along the inner margin of said sealed periphery, whereby the upper layers may be completely removed exposing the full area internally of said sealed periphery, said upper layers completely encompassing the area within said sealed periphery and said overlapped sections providing an opening for said envelope.

2. A device according to claim 1 in which the layers are sewn together to form the peripheral seal.

3. A device according to claim 1 in which the layers are heat sealed together to form the peripheral seal.

References Cited in the file of this patent

UNITED STATES PATENTS

| | | |
|---|---|---|
| 1,576,488 | Hodgson | Mar. 9, 1926 |
| 2,200,971 | Sonneborn et al. | May 14, 1940 |
| 2,572,056 | Salfisberg | Oct. 23, 1951 |
| 2,616,376 | Hammerstein | Nov. 4, 1952 |
| 2,699,738 | Brittain | Jan. 18, 1955 |